US008278252B2

(12) United States Patent
Crews et al.

(10) Patent No.: US 8,278,252 B2
(45) Date of Patent: *Oct. 2, 2012

(54) NANO-SIZED PARTICLES FOR STABILIZING VISCOELASTIC SURFACTANT FLUIDS

(75) Inventors: James B. Crews, Willis, TX (US); Tianping Huang, Spring, TX (US); James H. Treadway, Magnolia, TX (US); John R. Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 977 days.

This patent is subject to a terminal disclaimer.

(21) Appl. No.: 11/849,820

(22) Filed: Sep. 4, 2007

(65) Prior Publication Data

US 2008/0051302 A1 Feb. 28, 2008

Related U.S. Application Data

(63) Continuation-in-part of application No. 11/125,465, filed on May 10, 2006, and a continuation-in-part of application No. 11/755,581, filed on May 30, 2007.

(60) Provisional application No. 60/845,916, filed on Sep. 20, 2006, provisional application No. 60/570,601, filed on May 13, 2004, provisional application No. 60/815,693, filed on Jun. 22, 2006.

(51) Int. Cl.
*C09K 8/58* (2006.01)
*C09K 8/68* (2006.01)

(52) U.S. Cl. ........ 507/271; 507/240; 507/241; 507/245; 507/272; 507/276; 166/305.1

(58) Field of Classification Search .................. None
See application file for complete search history.

(56) References Cited

U.S. PATENT DOCUMENTS

| 4,235,728 | A | * | 11/1980 | Schulz et al. | 507/103 |
| 4,931,195 | A | * | 6/1990 | Cao et al. | 510/304 |
| 5,964,295 | A | | 10/1999 | Brown et al. | |
| 6,211,120 | B1 | * | 4/2001 | Welch et al. | 507/270 |
| 6,258,859 | B1 | * | 7/2001 | Dahayanake et al. | 516/77 |
| 6,605,570 | B2 | * | 8/2003 | Miller et al. | 507/211 |
| 6,613,720 | B1 | * | 9/2003 | Feraud et al. | 507/200 |
| 7,060,661 | B2 | * | 6/2006 | Dobson et al. | 507/245 |

(Continued)

OTHER PUBLICATIONS

C. H. Bivins, et al., "New Fibers for Hydraulic Fracturing," Oilfield Review, Summer 2005, pp. 34-43.

*Primary Examiner* — John J Figueroa
(74) *Attorney, Agent, or Firm* — Mossman Kumar & Tyler PC (57) ABSTRACT

An aqueous, viscoelastic fluid gelled with a viscoelastic surfactant (VES) is stabilized and improved with an effective amount of an alkaline earth metal oxide, alkaline earth metal hydroxide, alkali metal oxides, alkali metal hydroxides, transition metal oxides, transition metal hydroxides, post-transition metal oxides, and post-transition metal hydroxides. These fluids are more stable and have a reduced or no tendency to precipitate, particularly at elevated temperatures. The additives may reduce the amount of VES required to maintain a given viscosity. These stabilized, enhanced, aqueous viscoelastic fluids may be used as treatment fluids for subterranean hydrocarbon formations, such as in hydraulic fracturing. The particle size of the magnesium oxide or other agent may be nanometer scale, which scale may provide unique particle charges that use chemisorption, crosslinking and/or other chemistries to associate and stabilize the VES fluids.

13 Claims, 8 Drawing Sheets

U.S. PATENT DOCUMENTS

| | | | |
|---|---|---|---|
| 7,081,439 B2* | 7/2006 | Sullivan et al. | 507/269 |
| 7,125,825 B2* | 10/2006 | Moss | 507/240 |
| 7,207,388 B2* | 4/2007 | Samuel et al. | 166/294 |
| 7,265,079 B2* | 9/2007 | Willberg et al. | 507/203 |
| 2003/0234103 A1* | 12/2003 | Lee et al. | 166/293 |
| 2004/0106525 A1* | 6/2004 | Willberg et al. | 507/200 |
| 2004/0152601 A1* | 8/2004 | Still et al. | 507/100 |
| 2005/0107265 A1 | 5/2005 | Sullivan et al. | |
| 2005/0252658 A1 | 11/2005 | Willingham et al. | |
| 2006/0276023 A1 | 12/2006 | Huang | |

* cited by examiner

Regain Permeability Tests with Berea Cores (1" x 6" (2.5 x 15.2 cm)) at 250°F (121°C)

A: 13.0ppg (1.6 kg/l) ($CaCl_2/CaBr_2$) + 4% WG-3L + 6 pptg (0.7 kg/m$^3$) VES-STA1 + 1gptg GBW-407L
B: 13.0ppg (1.6 kg/l) ($CaCl_2/CaBr_2$) + 4% WG-3L + 6 pptg (0.7 kg/m$^3$) LCA-N801 + 1gptg GBW-407L

NANO-SIZED PARTICLES FOR STABILIZING VISCOELASTIC SURFACTANT FLUIDS

CROSS-REFERENCE TO RELATED APPLICATIONS

This application claims the benefit of U.S. Provisional Patent Application 60/845,916 filed Sep. 20, 2006, and is a continuation-in-part application of U.S. Ser. No. 11/125,465 filed May 10, 2006 which in turn claims the benefit of U.S. Provisional Patent Application 60/570,601 filed May 13, 2004, and is a continuation-in-part application of U.S. Ser. No. 11/755,581 filed May 30, 2007 which in turn claims the benefit of U.S. Provisional Patent Application 60/815,693 filed Jun. 22, 2006.

TECHNICAL FIELD

The present invention relates to aqueous viscoelastic fluids used during hydrocarbon recovery operations, and more particularly relates, in one non-limiting embodiment, to methods and additives for stabilizing and improving such aqueous, viscoelastic fluids.

BACKGROUND

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which may cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations and the conductivity of propped fractures.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are also used as acid diverting, water and/or gas control fluids. VES fluids are non-cake-building fluids, and thus leave no potentially damaging polymer cake residue.

It has been discovered that alkaline earth metal oxides, alkaline earth metal hydroxides, transition metal oxides, transition metal hydroxides, and mixtures thereof, and in particular magnesium oxide may serve to inhibit or prevent fluid loss in aqueous fluids gelled with VESs, as described in U.S. patent application Ser. No. 11/755,581 filed May 30, 2007 (U.S. Patent Application Publication No. 2008/0060812 A1), incorporated herein in its entirety by reference. Some of these same materials may also be effective as system stabilizers and performance enhancers for aqueous fluids gelled with VESs, as described in U.S. patent application Ser. No. 11/125,465 (U.S. Patent Application Publication 2005/0252658 A1), also incorporated herein in its entirety by reference. However, even these additives may plate out on the face of the formation. It would be desirable if a method and/or composition would be devised to make the system stabilizers more effective in stabilizing the viscosity of VES fluid, particularly the gelled fluid which has leaked-off into the treated reservoir, and to reduce such leak-off.

SUMMARY

There is provided, in one form, a method for treating a subterranean formation that involves providing an aqueous viscoelastic surfactant treating fluid. The aqueous viscoelastic surfactant treating fluid contains an aqueous base fluid, a viscoelastic surfactant (VES) gelling agent, and a particulate additive. The particulate additive has a mean particle size of 100 nm or less, and may be an alkaline earth metal oxide, alkaline earth metal hydroxide, transition metal oxides, transition metal hydroxides, post-transition metal oxides, and post-transition metal hydroxides, and/or mixtures thereof. The aqueous viscoelastic surfactant treating fluid is injected through a wellbore and into the subterranean formation and the formation is thereby treated.

There is additionally provided in another non-limiting embodiment an aqueous viscoelastic surfactant treating fluid having an aqueous base fluid, a viscoelastic surfactant, and a readily water soluble particulate additive. The readily water soluble particulate additive may be an alkali metal oxide, an alkali metal hydroxide, and mixtures thereof.

There is further provided in another non-limiting embodiment an aqueous viscoelastic surfactant treating fluid having an aqueous base fluid, a viscoelastic surfactant (VES) gelling agent and a particulate additive. The particulate additive has a mean particle size of 100 nm or less, and may be an alkaline earth metal oxide, alkaline earth metal hydroxide, alkali metal oxide, alkali metal hydroxide, transition metal oxides, transition metal hydroxides, post-transition metal oxides, and post-transition metal hydroxides, and mixtures thereof.

The readily water soluble additives (e.g. $Na_2O$, $K_2O$, $Li_2O$, NaOH, KOH, and LiOH) appear to improve the thermal stability of VES fluids, will go wherever the VES fluid goes during a treatment, are easily removed from the reservoir with the VES fluid, and leave little if any pore plugging type formation damage. These agents may be dissolved in water and added as a liquid or as readily water soluble solids during the treatment. The alkali metal hydroxides have utility over a broad range of temperature of about 180° F. to about 300° F. (about 82° C. to about 149° C.).

The particulate additives, also referred to herein as stabilizing or stabilizer agents (e.g. MgO and/or Mg(OH)$_2$, and the like), appear to improve the thermal stability of VES micelle structures when heated, that is, the VES fluid viscosity is more stable over time as fluid temperature is increased. The stabilizing agents have utility over a broad range of temperature of about 180° F. to about 300° F. (about 82° C. to about 149° C.). In many cases, clean-up of VES fluids may be improved by use of nano size particulate additives that may be much smaller than the pores and pore-throat passages within a hydrocarbon reservoir, thereby being non-pore plugging particles that are easier to be removed and less damaging to the reservoir permeability. Additionally, the viscosity stability of the VES fluid may be further improved by use of nano-sized particles that are able to stay within the VES fluid and travel where the VES fluid goes, including any fluid which is leaked-off, that is, any VES fluid that invades and enters the reservoir pores during a treatment, such as during a gravel-pack, frac-pack, hydraulic frac, and the like. Since the nano-sized particulate additives stay within the VES fluid, they thereby continue to stabilize the viscosity of the leaked-off VES fluid. This is in contrast to larger size particulate additives that become bridged-off (i.e. which plate out and are left upon the reservoir face and prevented from entering the reservoir pores with the VES fluid), including VES stabilizer agents that are larger than about 100 to 1000 nanometers in size.

The improved (more thermally stable) viscosity of the leaked-off VES fluid may be of utility at greater than 200° F. (93° C.) bottom hole static temperature (BHST) as a pseudo-viscosity wall in the near formation face pores that may limit the rate of additional VES fluid leak-off during a stimulation treatment, which includes the additional presence of a stimulating agent. Additionally, nano-sized particulate additives are physically easier to produce back with the VES fluid after a treatment, whereas the larger size particles may take longer to become dislodged (unplugged) from the reservoir pores, and may leave a degree of restricted flow and reservoir damage. However, there may be occasions, such as when using small amounts of particulate additives, that plating out the larger size particles may have utility and/or advantage over use of nano size stabilizer particles. For example, the plating out of a small amount of larger size stabilizer particles may result in the leaked-off VES fluid "breaking" in viscosity, and for some reservoir conditions (i.e. higher reservoir permeability, higher reservoir pressure crude oil producing zones, and the like) and VES fluid compositions (i.e. type and amount of salts, co-surfactants, solvents, co-solvents, and the like), the viscosity-broken VES fluid may achieve greater than 60% or even 80% return permeability cleanup—a higher cleanup value than achieved in many polymeric based treatment fluids. Thus, in some cases the larger stabilizing particles may be used to first act as a gel stabilizer during the main portion of the VES treatment and then later act indirectly as a viscosity breaker for the fluid leaked-off into the reservoir, since such fluid may not have enough stabilizer particles to stabilize the fluid's viscosity any longer.

The addition of alkali metal oxides, such as lithium oxide; alkali metal hydroxides, such as potassium hydroxide; alkaline earth metal oxides, such as magnesium oxide; alkaline earth metal hydroxides, such as calcium hydroxide; transition metal oxides, such as titanium oxide and zinc oxide; transition metal hydroxides; post-transition metal oxides, such as aluminum oxide; and post-transition metal hydroxides (i.e. for all sizes of the stabilizing agents) to an aqueous fluid gelled with a VES may increase the viscosity of the fluid, may indirectly reduce the viscosity of the fluid, may reduce the rate of fluid leak-off into the reservoir, may improve the thermal stability of the fluid's viscosity, and may prevent or inhibit the precipitation-like phase separation of the viscoelastic surfactant by improving its high temperature aqueous solubility, and combinations of these effects. In particular, the VES-gelled aqueous fluids containing these agents may be more stable at high temperatures, such as at 200° F. (93° C.) or higher. This discovery allows the VES system to be used at a higher temperature, and helps minimize formation damage after hydraulic fracturing operations. The introduction of these additives to the VES systems could also possibly lower the amount of VES surfactant needed to obtain the stable fluid viscosity necessary to perform VES applications or treatments, particularly since less of the VES is lost due to oil-like phase separation, thermal degradation precipitation, and the like.

DETAILED DESCRIPTION

Magnesium oxide particles and powders have been used as stabilizers for VES-gelled aqueous fluids at temperatures from about 180 to about 300° F. (about 82 to about 149° C.) as disclosed in U.S. patent application Ser. No. 11/125,465 (U.S. Patent Application Publication No. 2005/0252658 A1). However, it has been discovered that nano-sized particles of alkaline earth metal oxides, alkaline earth metal hydroxides, alkali metal oxides, alkali metal hydroxides, transition metal oxides, transition metal hydroxides, post-transition metal oxides, and post-transition metal hydroxides, and mixtures thereof have particular advantages for improving the thermal stability of a VES-gelled aqueous fluid, and because of their small size such particles stay with the VES-gelled fluid, rather than plate out on the reservoir face. Thus, the use of these stabilizers may permit less amount of the VES to be used to obtain the same level of viscosity.

It will be appreciated that although MgO particles are noted throughout the application herein as one representative or suitable type of alkaline earth metal oxide and/or alkaline earth metal hydroxide particle, other alkali earth metal oxides and/or alkaline earth metal hydroxides and/or transition metal oxides, transition metal hydroxides, post-transition metal oxides, and post-transition metal hydroxides, may be used in the methods and compositions herein. Additionally, the alkali metal oxides and/or hydroxides may be used alone or in combination with the alkaline earth metal oxides and hydroxides, and/or together with one or more transition metal oxide, transition metal hydroxide, post-transition metal oxide, and post-transition metal hydroxide.

By "post-transition metal" is meant one or more of aluminum, gallium, indium, tin, thallium, lead and bismuth. In another non-limiting embodiment herein, the nano-sized particles are oxides and hydroxides of elements of Groups IA, IIA, IVA, IIB and IIIB of the previous IUPAC American Group notation. These elements include, but are not necessarily limited to, Na, K, Mg, Ca, Ti, Zn and/or Al.

Figure 4:
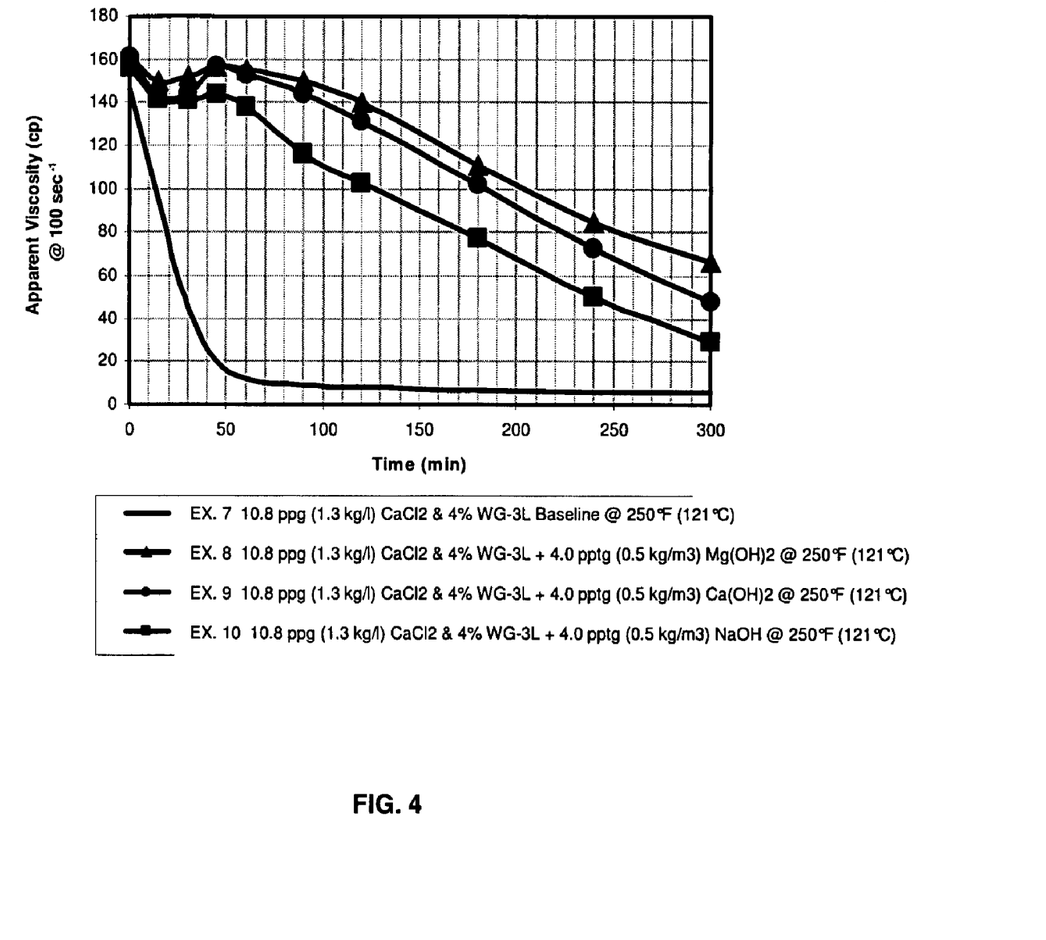
FIG. 4 is a graph of the apparent viscosity of a 4% VES aqueous fracturing system at 250° F. (121° C.) over time without an additive, and with 4.0 pptg (0.5 kg/m$^3$) Mg(OH)$_2$, 4.0 pptg (0.5 kg/m$^3$) Ca(OH)$_2$ and 4.0 pptg (0.5 kg/m$^3$) NaOH stabilizers.

In a specific instance, the alkali metal hydroxide NaOH has been found to improve the thermal stability of VES fluids, as the NaOH test data (Example 10) shows in FIG. 4. The alkali metal hydroxide additives LiOH, NaOH, and KOH readily dissolve in water and will travel wherever the VES fluid flows during a treatment, and therefore will be easily removed from the reservoir with the VES fluid and may not induce particulate pore plugging type formation damage.

Core flow tests with VES-STA1 MgO particles high temperature VES stabilizer developed by Baker Oil Tools showed plating out of most of the MgO particles on the test core face during VES-gelled fluid injection into the cores. This MgO product has a mean particle size of about 5 microns. These particles were too large to penetrate the 50 to 500 millidarcy (md) Berea test cores. It was discovered that by using very small MgO particles, such as nanometer-sized particles, the particles would stay within the VES that leaks off into the subterranean formation during a treatment. Testing of these nano-particle MgO, designated LCA-N801 may be used to stabilize VES-gelled aqueous fluids in place of VES-STA1 MgO particles with similarly good results.

Figure 5:
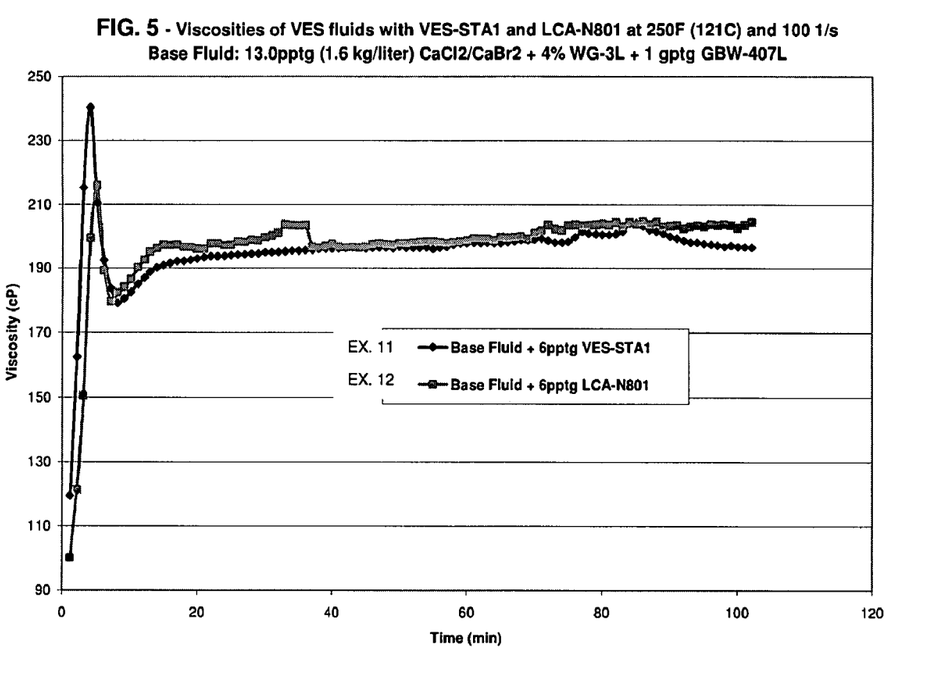
FIG. 5 is a graph comparing the viscosities of VES fluids at 250° F. (121° C.) and 100 sec$^{-1}$ using a base fluid of 13.0 pptg (1.6 kg/liter) CaCl$_2$/CaBr$_2$ and 4% SurFRAQ™ WG-3L VES surfactant and 1 gptg GBW-407L comparing 6 pptg (0.7 kg/m$^3$) VES-STA1 MgO particles of a relatively larger (micron) size to an otherwise identical fluid containing 6 pptg (0.7 kg/m$^3$) LCA-N801 MgO particles of a nanometer size.

This use of nanometer-sized particles is an improvement over the previous VES-gelled fluid stabilizing chemistry. The LCA-N801 particles have a mean particle size of 30 nanometers (nm). The LCA-N801 nano-MgO product was shown in laboratory tests to pass through the Berea test cores with no plating or accumulation of MgO particles on the core faces or within the core pore matrix. Viscosity stability tests show both particles may achieve thermal stability of the VES-micelles at 250° F. (121° C.) over time (FIG. 5, Examples 11-12), but regain permeability tests (discussed in conjunction with FIGS. 6, 7, and 8 and Examples A and B) show that nano size MgO particles do not generate damage or as great a potential for damage.

The nano-sized MgO particles are also suspected of having additional chemistry useful for VES thermal stability. Without being limited to any one particular theory, it is suspected that some nano-sized MgO particles have unique particle charges that use chemisorption, crosslinking and/or other chemistries to associate and stabilize the VES micelles. This technical improvement is helpful in the field when applying the MgO stabilizer technology, to assure VES-gelled fluid stability when leaked-off into a reservoir during a frac-pack or other treatment.

The solid particulates and powders useful herein include, but are not necessarily limited to, slowly water-soluble alkaline earth metal oxides or alkaline earth metal hydroxides, or mixtures thereof. In one non-limiting embodiment, the alkali earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as $Mg(OH)_2$, $CaO$, $Ca(OH)_2$, $SiO_2$, $Al_2O_3$, and the like.

In another non-limiting embodiment, the particle size of the additives and agents ranges between about 1 nanometer independently up to about 500 nanometer. In another non-limiting embodiment, the particle size ranges between about 4 nanometers independently up to about 100 nanometer. In another non-restrictive version, the particles may have a mean particle size of about 100 nm or less, alternatively about 50 nm or less, and in another possible version about 40 nm or less.

The amount of nano-sized particles in the VES-gelled aqueous fluid may range from about 0.5 to about 20.0 pptg (about 0.06 to about 2.4 kg/1000 liters). Alternatively, the lower threshold of the proportion range may be about 1.0 pptg (about 0.12 kg/1000 liters), while the upper threshold of proportion of the particles may independently be about 10.0 pptg (about 1.2 kg/1000 liters) pptg.

The nano-sized particles herein may be added along with the VES fluids prior to pumping downhole or other application. The VES-gelled aqueous fluids may be prepared by blending or mixing a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid (for completing a well) or other application, for a non-limiting example.

More specifically, and in non-limiting embodiments, the brines may be prepared using salts including, but not necessarily limited to, $NaCl$, $KCl$, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines may be from about 0.5% by weight of water up to near saturation for a given salt in fresh water, such as 10%, 20%, 30% and higher percent salt by weight of water. The brine may be a combination of one or more of the mentioned salts, such as a brine prepared using $NaCl$ and $CaCl_2$ or $NaCl$, $CaCl_2$, and $CaBr_2$ as non-limiting examples.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One useful VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives of this invention may also be used in Diamond FRAQ™ which is a VES system, similar to SurFRAQ, which contains VES breakers sold by Baker Oil Tools.

The amount of VES included in the fracturing fluid, as one non-limiting embodiment of a treatment fluid herein, depends on two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the proportion range herein may be from about 1.0 to about 6.0% by volume VES product. In an alternate, non-restrictive form of the invention, the amount of VES ranges from 2 to about 10 volume %.

In application, the stabilizing particles of MgO (or other particulate) may be mixed with the VES-gelled fluids at the surface before they are pumped downhole.

In hydraulic fracturing applications, propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations may be used as the fracture design requires. The base fluid may also contain other conventional additives common to the well service industry such as water wetting surfactants, non-emulsifiers and the like. In the methods and compositions herein, the base fluid may also contain additives which may contribute to breaking the gel (reducing the viscosity) of the VES fluid.

While the viscoelastic fluids herein are described most typically herein as having use in fracturing fluids, it is expected that they will find utility in completion fluids, gravel pack fluids, fluid loss pills, lost circulation pills, diverter fluids, foamed fluids, stimulation fluids, water and/or gas control fluids, enhanced oil recovery (i.e. tertiary recovery) fluids, and the like.

In another non-restrictive embodiment, the treatment fluid may contain other viscosifying agents, other different surfactants, clay stabilization additives, scale dissolvers, biopolymer degradation additives, and other common and/or optional components.

In a particularly useful embodiment herein, use of these particulate additives with internal VES breakers, such as polyenoic acid, may have synergistic clean-up effects for the nano size particle stabilized VES fluid. The nano-sized particle stabilizer agents may reduce or inhibit oil-like phase separation of the leaked-off VES fluids within the reservoir pores and with internal breaker present to reduce the leaked-off VES fluid's viscosity more rapid and possibly more complete VES fluid removal may be achieved, with return permeability as high as 90% and greater (as discussed with respect to FIGS. 6, 7, and 8).

The proppant, solid particle or gravel may be any solid particulate matter suitable for its intended purpose, for example as a screen or proppant, etc. Suitable materials include, but are not necessarily limited to sand, sintered bauxite, sized calcium carbonate, other sized salts, ceramic beads, and the like, and combinations thereof. These solids may also be used in a fluid loss control application.

The invention will be further described with respect to the following Examples which are not meant to limit the invention, but rather to further illustrate the various embodiments.

EXAMPLES 1-2

The invention was tested in 10.5 ppg (1.26 kg/liter) calcium chloride brine at 270° F. (132° C.). Example 1 did not contain any alkaline earth metal additive. Viscosity was measured on a Grace Instrument Company M5500 HTHP Viscometer at the indicated shear rates at the time intervals indicated in Table I. It may be seen that for each shear rate, the viscosity at this temperature rapidly drops as a function of time. Testing was stopped after only 40 minutes.

Figure 1:
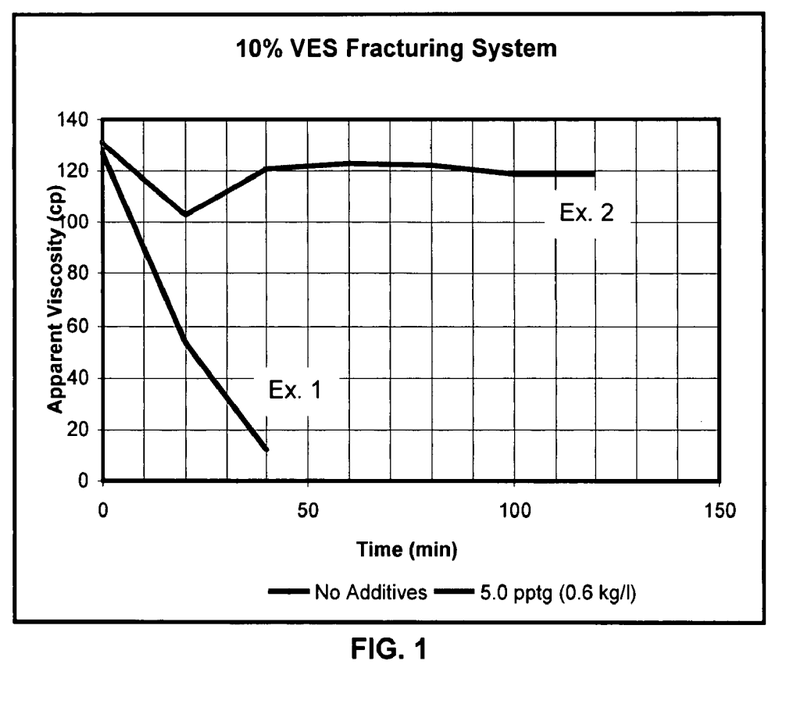
FIG. 1 is a graph of the apparent viscosity of a 10% VES aqueous fracturing system at 270° F. (132° C.) over time with and without 5.0 pptg (0.6 kg/m$^3$) MgO stabilizer.

For Example 2, 5.0 pptg (0.6 kg/l) MgO system stabilizer was added to the system of Example 1 and testing at the same shear rates over time was per-formed, However, it may be seen that the viscosity only decreased slightly over time. Testing was discontinued after two hours since it seemed the treated VES-gelled aqueous fluid was stable. FIG. 1 is a plot of the Example 1 and Example 2 viscosity data as a function of time for the 100 sec$^{-1}$ shear rate showing the contrast between the two and the great improvement in stability made by the additive.

TABLE I

10% VES System @ 270° F. (132° C.)

| Time (min) | 511 sec$^{-1}$ | 170 sec$^{-1}$ | 100 sec$^{-1}$ | 40 sec$^{-1}$ |
|---|---|---|---|---|
| Example 1: 10% VES in 10.5 ppg (1.26 kg/liter) CaCl$_2$ Brine @ 270° F. (132° C.) (no additives) | | | | |
| 0 | 75 | 107 | 127 | 170 |
| 20 | 34 | 46 | 53 | 68 |
| 40 | 8 | 10 | 12 | 15 |
| Ex. 2: 10% VES in 10.5 ppg (1.26 kg/liter) CaCl$_2$ Brine @ 270° F. (132° C.) (5.0 pptg (0.6 kg/l) System Stabilizer) | | | | |
| 0 | 78 | 110 | 131 | 176 |
| 20 | 63 | 88 | 103 | 136 |
| 40 | 72 | 102 | 121 | 162 |
| 60 | 73 | 104 | 123 | 164 |
| 80 | 73 | 103 | 122 | 163 |
| 100 | 71 | 101 | 119 | 159 |
| 120 | 71 | 101 | 119 | 159 |

EXAMPLE 3

Figure 2:
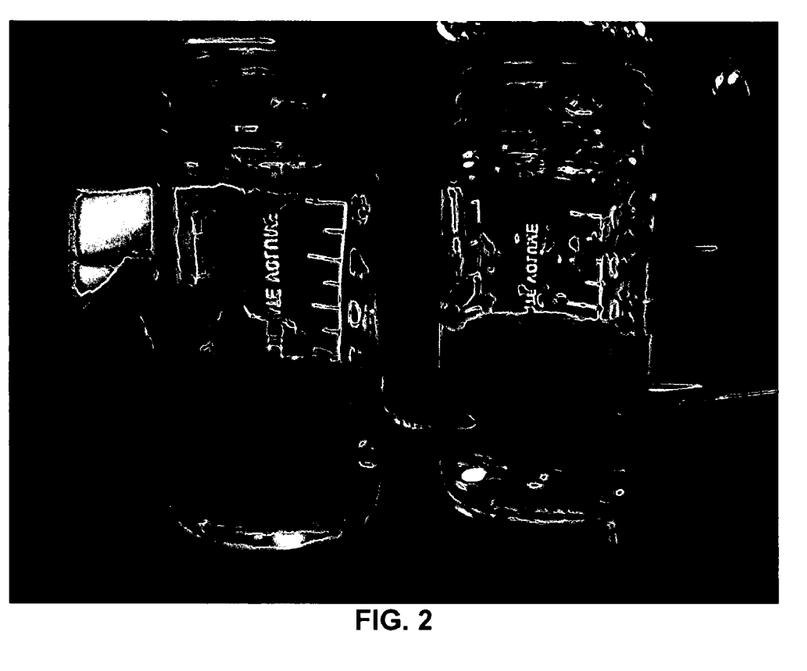
FIG. 2 is a photograph showing two fluids containing the same VES loading in the same brine fluid, where the fluid without MgO (bottle on right) shows VES precipitation or phase separation and the fluid with MgO (bottle on left) does not show VES precipitation or phase separation.

Two otherwise identical brine fluids having the same VES loading are shown in the photograph of FIG. 2. The fluid on the left contains the magnesium oxide stabilizing additive herein while the fluid on the right does not. After being tested at a temperature greater than 200° F. (93° C.), the fluid without the magnesium oxide shows the precipitation of the VES surfactant, whereas the fluid with the magnesium oxide does not show VES surfactant precipitation.

EXAMPLES 4-6

Figure 3:
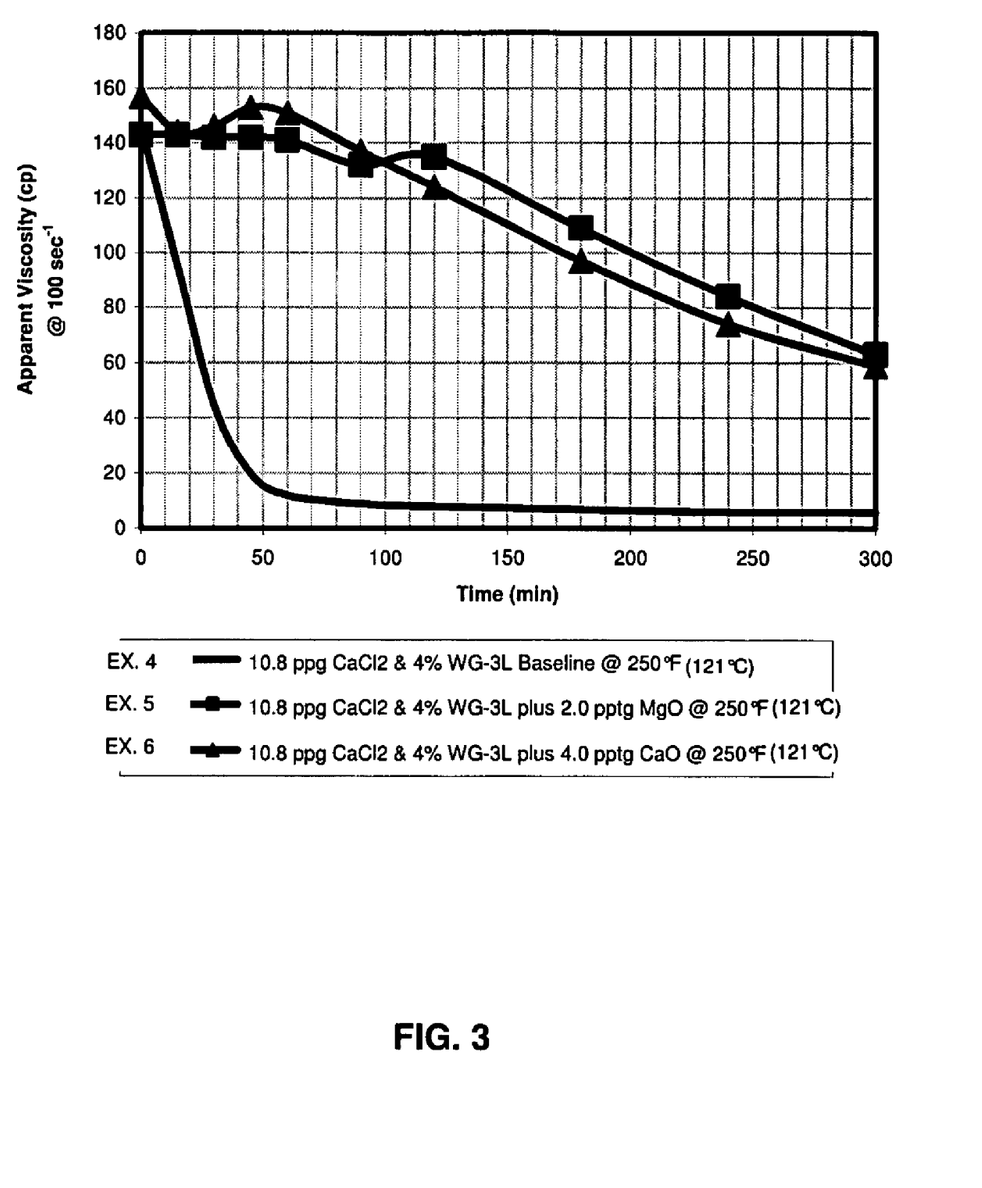
FIG. 3 is a graph of the apparent viscosity of a 4% VES aqueous fracturing system at 250° F. (121° C.) over time without an additive, and with 2.0 pptg (0.2 kg/m$^3$) MgO and 4.0 pptg CaO stabilizers.

The invention was further tested in 10.8 ppg (1.3 kg/liter) calcium chloride brine with 4% SurFRAQ™ WG-3L VES surfactant at 250° F. (121° C.). Example 4 did not contain any alkaline earth metal additive. Examples 5 and 6 used 2.0 pptg (0.24 kg/liter) MgO stabilizer and 4.0 pptg (0.42 kg/liter) CaO stabilizers respectively. Viscosity was measured as indicated for Examples 1 and 2. As may be seen from the data presented in Table II and plotted in FIG. 3, viscosity decreased rapidly with no additive, but only much slower with the additives.

TABLE II

VES Systems with Oxide Stabilizers

| Time (min) | 511 sec$^{-1}$ | 170 sec$^{-1}$ | 100 sec$^{-1}$ | 40 sec$^{-1}$ |
|---|---|---|---|---|
| Example 4: 4% VES in 10.8 ppg (1.3 kg/liter) CaCl$_2$ Brine @ 250° F. (121° C.) (no additives Baseline) | | | | |
| 0 | 67 | 114 | 146 | 225 |
| 15 | 59 | 82 | 95 | 124 |
| 30 | 25 | 37 | 45 | 63 |
| 45 | 12 | 17 | 20 | 27 |
| 60 | 8 | 11 | 12 | 15 |
| 90 | 6 | 8 | 9 | 12 |
| 120 | 6 | 7 | 8 | 9 |
| 180 | 4 | 6 | 7 | 10 |
| 240 | 4 | 5 | 6 | 8 |
| 300 | 4 | 5 | 6 | 8 |
| Example 5: 4% VES in 10.8 ppg (1.3 kg/liter) CaCl$_2$ Brine @ 250° F. (121° C.) (2.0 pptg (0.24 kg/liter) MgO Stabilizer) | | | | |
| 0 | 71 | 114 | 143 | 211 |
| 15 | 115 | 133 | 143 | 162 |
| 30 | 119 | 134 | 142 | 156 |
| 45 | 92 | 123 | 142 | 181 |
| 60 | 88 | 121 | 141 | 184 |
| 90 | 91 | 117 | 132 | 162 |
| 120 | 85 | 116 | 135 | 175 |
| 180 | 66 | 92 | 109 | 145 |
| 240 | 50 | 71 | 84 | 112 |
| 300 | 39 | 54 | 63 | 83 |
| Example 6: 4% VES in 10.8 ppg (1.3 kg/liter) CaCl$_2$ Brine @ 250° F. (121° C.) (4.0 pptg (0.42 kg/liter) CaO Stabilizer) | | | | |
| 0 | 79 | 125 | 157 | 232 |
| 15 | 94 | 126 | 144 | 183 |
| 30 | 97 | 128 | 146 | 184 |
| 45 | 90 | 129 | 153 | 206 |
| 60 | 88 | 127 | 151 | 204 |
| 90 | 80 | 115 | 137 | 186 |
| 120 | 72 | 104 | 124 | 169 |
| 180 | 56 | 81 | 97 | 132 |
| 240 | 38 | 59 | 74 | 108 |
| 300 | 29 | 47 | 59 | 88 |

EXAMPLES 7-10

The invention was additionally tested in 10.8 ppg (1.3 kg/liter) calcium chloride brine with 4% SurFRAQ™ WG-3L VES surfactant at 250° F. (121° C.). Example 7 did not contain any alkaline earth metal additive. Examples 8, 9 and 10 used 4.0 pptg (0.42 kg/liter) Mg(OH)$_2$, Ca(OH)$_2$ and NaOH stabilizers respectively. Viscosity was measured as indicated for Examples 1 and 2. As may be seen from the data presented in Table III and plotted in FIG. 4, viscosity decreased rapidly with no additive, but only much slower with the additives.

TABLE III

VES Systems with Hydroxide Stabilizers

| Time (min) | 511 sec$^{-1}$ | 170 sec$^{-1}$ | 100 sec$^{-1}$ | 40 sec$^{-1}$ |
|---|---|---|---|---|
| Example 7: 4% VES in 10.8 ppg (1.3 kg/liter) CaCl$_2$ Brine @ 250° F. (121° C.) (no additives Baseline) | | | | |
| 0 | 67 | 114 | 146 | 225 |
| 15 | 59 | 82 | 95 | 124 |
| 30 | 25 | 37 | 45 | 63 |
| 45 | 12 | 17 | 20 | 27 |
| 60 | 8 | 11 | 12 | 15 |
| 90 | 6 | 8 | 9 | 12 |
| 120 | 6 | 7 | 8 | 9 |
| 180 | 4 | 6 | 7 | 10 |
| 240 | 4 | 5 | 6 | 8 |
| 300 | 4 | 5 | 6 | 8 |
| Example 8: 4% VES in 10.8 ppg (1.3 kg/liter) CaCl$_2$ Brine @ 250° F. (121° C.) (4.0 pptg (0.42 kg/liter) Mg(OH)$_2$ Stabilizer) | | | | |
| 0 | 78 | 127 | 161 | 242 |
| 15 | 93 | 128 | 150 | 197 |
| 30 | 96 | 131 | 152 | 197 |
| 45 | 91 | 131 | 157 | 214 |
| 60 | 90 | 130 | 155 | 210 |
| 90 | 87 | 126 | 150 | 203 |
| 120 | 78 | 116 | 140 | 194 |
| 180 | 63 | 92 | 111 | 153 |
| 240 | 44 | 68 | 85 | 123 |
| 300 | 31 | 52 | 67 | 102 |

TABLE III-continued

VES Systems with Hydroxide Stabilizers

| Time (min) | 511 sec$^{-1}$ | 170 sec$^{-1}$ | 100 sec$^{-1}$ | 40 sec$^{-1}$ |
|---|---|---|---|---|
| Example 9: 4% VES in 10.8 ppg (1.3 kg/liter) CaCl$_2$ Brine @ 250° F. (121° C.) (4.0 pptg Ca(OH)$_2$ (0.42 kg/liter) Stabilizer) | | | | |
| 0 | 78 | 127 | 161 | 243 |
| 15 | 97 | 126 | 143 | 178 |
| 30 | 95 | 126 | 144 | 182 |
| 45 | 87 | 129 | 157 | 219 |
| 60 | 85 | 126 | 153 | 213 |
| 90 | 79 | 118 | 144 | 202 |
| 120 | 72 | 108 | 131 | 183 |
| 180 | 56 | 84 | 102 | 142 |
| 240 | 37 | 59 | 73 | 106 |
| 300 | 23 | 38 | 48 | 72 |
| Example 10: 4% VES in 10.8 ppg (1.3 kg/liter) CaCl$_2$ Brine @ 250° F. (121° C.) (4.0 pptg (0.42 kg/liter) NaOH Stabilizer) | | | | |
| 0 | 75 | 123 | 156 | 236 |
| 15 | 88 | 122 | 142 | 185 |
| 30 | 91 | 122 | 141 | 180 |
| 45 | 86 | 122 | 144 | 192 |
| 60 | 80 | 116 | 138 | 187 |
| 90 | 66 | 96 | 116 | 160 |
| 120 | 58 | 86 | 103 | 142 |
| 180 | 38 | 61 | 77 | 115 |
| 240 | 25 | 40 | 50 | 74 |
| 300 | 14 | 23 | 29 | 43 |

EXAMPLES 11-12

A base fluid of 13.0 pptg (1.6 kg/liter) CaCl$_2$/CaBr$_2$ and 4% WG-3L with 4% SurFRAQ™ WG-3L VES surfactant and 1 gptg GBW-407L was used for these Examples. The viscosities of the fluids over time at 250° F. (121° C.) and 100 sec$^{-1}$ are graphed in FIG. 5. Example 11 (black) contained 6 pptg (0.7 kg/m$^3$) VES-STA1 MgO particles of a mean particle size of 5 microns as compared to the Example 12 (gray) fluid that contained the same amount (6 pptg (0.7 kg/m$^3$)) of LCA-N801 MgO particles having a mean particle size of 35 nanometers. It may be seen that the curves match very closely indicating very similar stabilities for the two fluids. Thus, the smaller sized MgO particles were no less stable than those of the larger size.

EXAMPLES A and B

Figure 6:
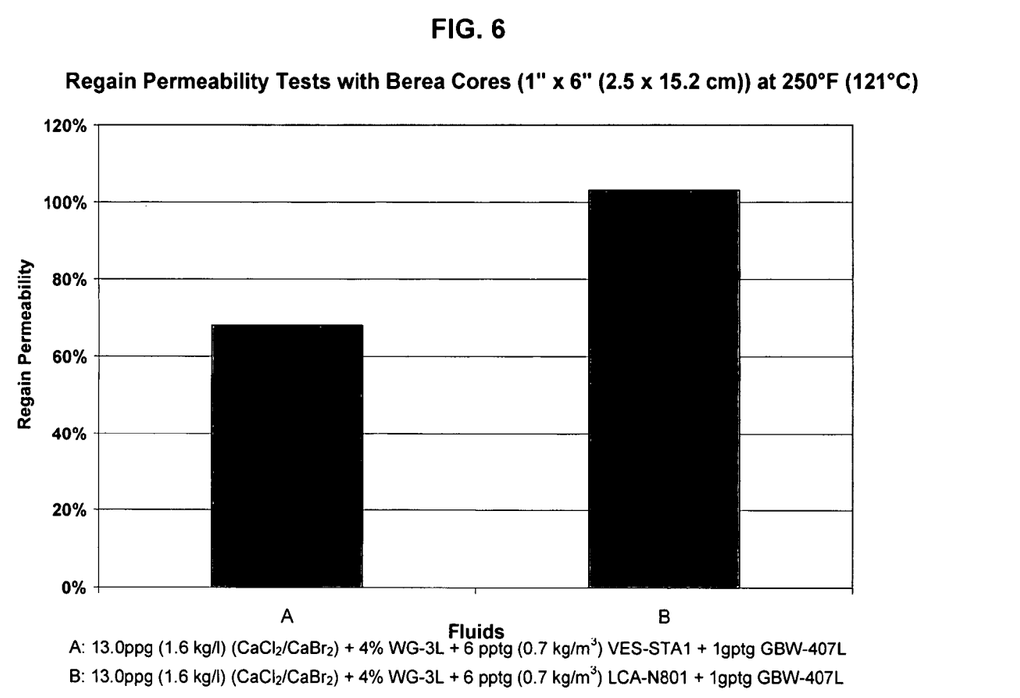
FIG. 6 is a graph comparing the regain permeability test results of VES fluids at 250° F. (121° C.) with two Berea cores using a base fluid of 13.0 pptg (1.6 kg/liter) CaCl$_2$/CaBr$_2$ and 4% SurFRAQ™ WG-3L VES surfactant and 1 gptg GBW-407L comparing 6 pptg (0.7 kg/m$^3$) VES-STA1 micron size MgO particles (Example A) to an otherwise identical fluid containing 6 pptg (0.7 kg/m$^3$) LCA-N801 nano size MgO particles (Example B)

Regain permeability test results of VES fluids at 250° F. (121° C.) using two Berea cores with a base fluid of 13.0 pptg (1.6 kg/liter) CaCl$_2$/CaBr$_2$ and 4% SurFRAQ™ WG-3L VES surfactant and 1 gptg GBW-407L were conducted to compare 6 pptg (0.7 kg/m$^3$) VES-STA1 micron size MgO particles (Example A) to an otherwise identical fluid containing 6 pptg (0.7 kg/m$^3$) LCA-N801 nano size MgO particles (Example B). The regain permeability of the core used for micron size MgO is 68% and that for nano size MgO is about 100%, which means that the nano size MgO of Example B shows no damage to the core. The regain permeabilities for Examples A and B are shown in the graph of FIG. 6.

Figure 7:
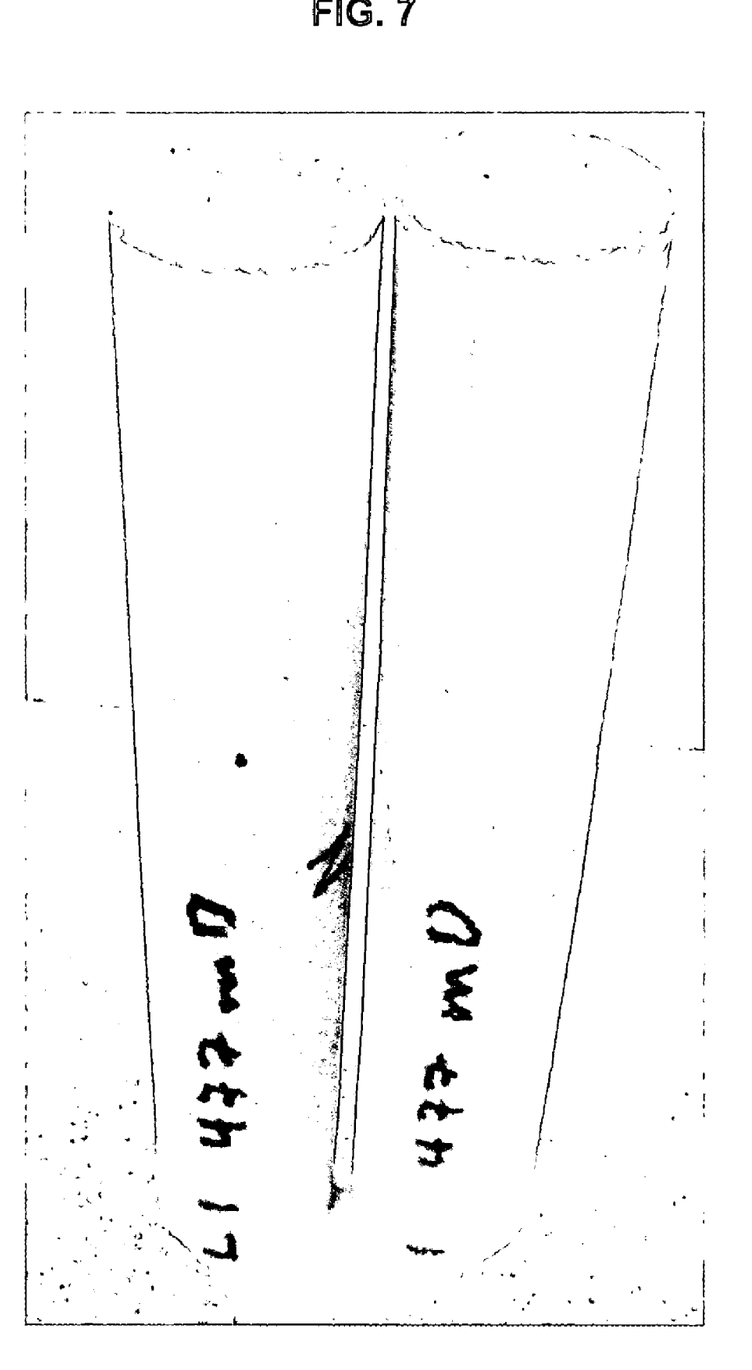
FIG. 7 is a photograph comparing the Berea cores used for the regain permeability tests Examples B (left) and A (right) of FIG. 6.
Figure 8:
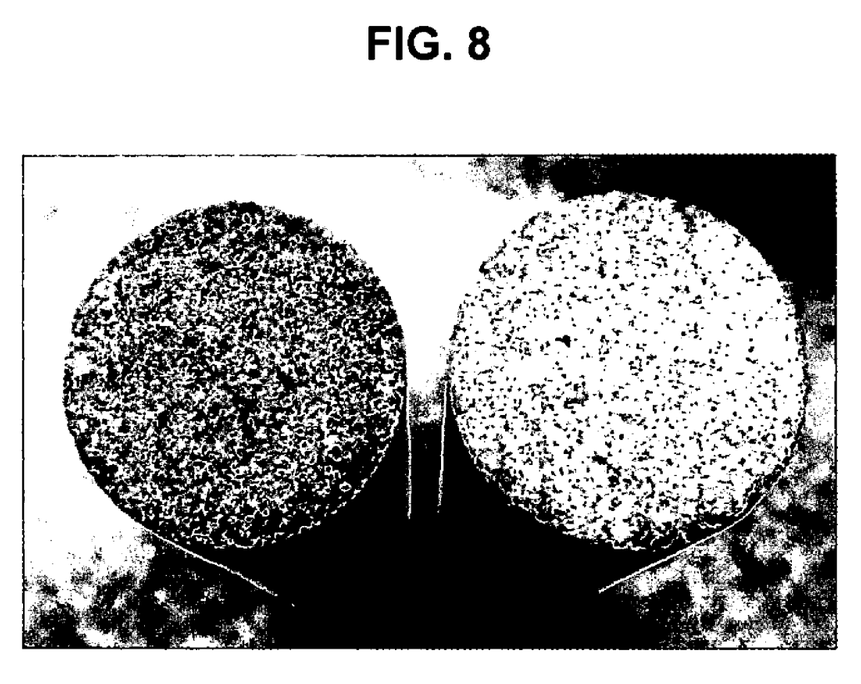
FIG. 8 is a photograph showing a closer look of the core faces of FIG. 7.

Shown in FIG. 7 is a picture comparing the Berea cores used for the regain permeability tests of Examples A and B. The core on the right is used for fluid of Example A in FIG. 6, which micron size MgO is added in. It may be seen that the core face is plugged with the micron size MgO. The core on the left is used for fluid of Example B in FIG. 6, where nano size MgO was used. It may be seen that the core face is clean. FIG. 8 is a picture of a closer look of the core faces in FIG. 7 more clearly demonstrating that the core of the Example A fluid plugged the face.

EXAMPLES 13-17

Illustrations of using other nano-sized particulate additives are presented in Examples 14-17. Example 13 is simply the aqueous base fluid with no particulate additive present; it is 13.0 pptg (1.6 kg/l) CaCl$_2$/CaBr$_2$ and 4% WG-3L VES surfactant. A curve for the Example 13 base fluid viscosity as a function of time is presented in FIG. 9 along with the curves for Examples 14-17. It may be seen that the Example 13 base fluid curve decreases steadily over time measured at 250° F. (121° C.) and 100 1/s.

Figure 9:
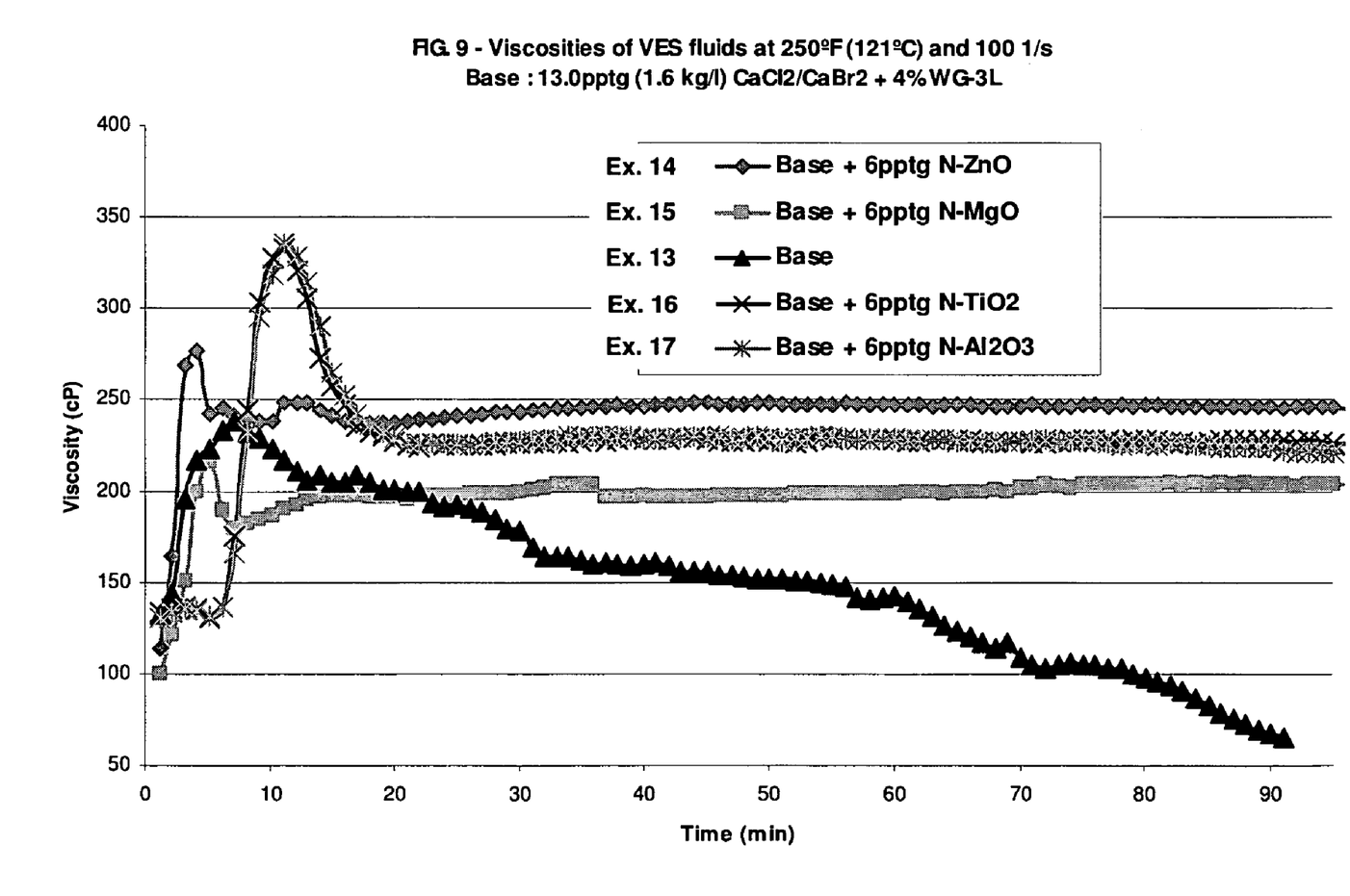
FIG. 9 is graph of fluid viscosity as a function of time for an aqueous base fluid gelled with a VES at 250° F. (121° C.) and 100 1/s without any nano-sized particulate additives, and then with four different types of nano-sized particles demonstrating how each helped stabilize the viscosities of these fluids.

The fluid of Example 14 is the base fluid of Example 13 also containing 6 pptg (0.7 kg/m$^3$) nanosized ZnO particles (N—ZnO); as may be seen from its curve in FIG. 9, these particles helped maintain the fluid viscosity at about 250 cP. The fluid of Example 15 was the base fluid also containing 6 pptg (0.7 kg/m$^3$) nanosized MgO particles (N—MgO); from FIG. 9 it may be seen that these particles helped maintain the fluid viscosity better than the base fluid alone, at a level of about 200 cP. The fluids of Examples 16 and 17 were the base fluid also containing 6 pptg (0.7 kg/m$^3$) nanosized TiO$_2$ and Al$_2$O$_3$ particles (N—TiO$_2$ and N—Al$_2$O$_3$, respectively); from FIG. 9 it may be seen that these particles gave nearly identical results as each other and helped maintain the fluid viscosity at a lower level than that of the Example 14 fluid, but at a higher level than the Example 15 fluid, and certainly better than the base fluid of Example 13 alone.

In the foregoing specification, it will be evident that various modifications and changes may be made thereto without departing from the broader spirit or scope of the invention as set forth in the appended claims. Accordingly, the specification is to be regarded in an illustrative rather than a restrictive sense. For example, specific combinations of alkaline earth metal oxides, alkaline earth metal hydroxides, alkali metal oxides, alkali metal hydroxides, transition metal oxides, transition metal hydroxides, post-transition metal oxides, and post-transition metal hydroxides, of various sizes, brines, viscoelastic surfactants, and other components falling within the claimed parameters, but not specifically identified or tried in a particular composition, are anticipated to be within the scope of this invention. In another non-limiting embodiment, the compositions and methods herein may find utility in delivering MgO and similar materials in the fields of livestock feeding, fertilizer handling and pharmaceuticals.

The word "comprising" as used throughout the claims is to interpreted "including but not limited to".

What is claimed is:

1. A method for treating a subterranean formation comprising:
   providing an aqueous viscoelastic surfactant treating fluid comprising:
      an aqueous base fluid;
      a viscoelastic surfactant (VES) gelling agent; and
      a particulate additive having a mean particle size of 100 nm or less, selected from the group consisting of alkaline earth metal oxides, alkaline earth metal hydroxides, alkali metal oxides, alkali metal hydroxides, transition metal oxides, transition metal hydroxides, post-transition metal oxides, and post-transition metal hydroxides, and mixtures thereof, where the transition metal in the transition metal oxide is selected from the group consisting of titanium and zinc and the post-transition metal in the post-transition metal oxide is selected from the group consisting of gallium, indium, thallium, lead and bismuth;

injecting the aqueous viscoelastic surfactant treating fluid through a wellbore and into the subterranean formation; and treating the subterranean formation.

2. The method of claim 1 where the aqueous base fluid is brine.

3. The method of claim 1 where the alkaline earth metal is selected from the group consisting of magnesium, calcium, strontium, barium and mixtures thereof, where the alkali metal is selected from the group consisting of lithium, sodium, potassium, where the transition metal is selected from the group consisting of titanium and zinc, and mixtures thereof.

4. The method of claim 1 where the effective amount of the additive ranges from about 0.5 to about 20.0 pptg (about 0.06 to about 2.4 kg/1000 liters) based on aqueous viscoelastic treating fluid.

5. The method of claim 1 where the aqueous viscoelastic surfactant treating fluid has an effect selected from the group consisting of:
- improved stability as compared with an otherwise identical fluid absent the additive,
- reduced precipitates as compared with an otherwise identical fluid absent the additive,
- and both.

6. The method of claim 1 where treating the subterranean formation is selected from the group consisting of
- fracturing the formation under effective pressure where the aqueous viscoelastic treating fluid further comprises a proppant;
- acidizing the formation where the aqueous viscoelastic treating fluid further comprises an acid;
- packing the formation with gravel where the aqueous viscoelastic treating fluid further comprises gravel;
- stimulating the formation where the aqueous viscoelastic surfactant treating fluid further comprises a stimulating agent;
- completing a well; and
- controlling fluid loss where the aqueous viscoelastic treating fluid further comprises a salt or easily removed solid; and mixtures thereof.

7. The method of claim 1 where for a period of time during the method the fluid is at a temperature between about 180° F. to about 300° F. (about 82° C. to about 149° C.).

8. The method of claim 1 where the mean particle size of the additive is 50 nm or less.

9. A method for treating a subterranean formation comprising:
- providing an aqueous viscoelastic surfactant treating fluid comprising:
  - an aqueous brine base fluid;
  - a viscoelastic surfactant (VES) gelling agent; and
  - from about 0.5 to about 20.0 pptg (about 0.06 to about 2.4 kg/1000 liters) based on the aqueous viscoelastic treating fluid of a particulate having a mean particle size of 100 nm or less, selected from the group consisting of alkaline earth metal oxides, alkaline earth metal hydroxides, alkali metal oxides, alkali metal hydroxides, transition metal oxides, transition metal hydroxides, post-transition metal oxides, and post-transition metal hydroxides, and mixtures thereof, where the transition metal in the transition metal oxide is selected from the group consisting of titanium and zinc and the post-transition metal in the post-transition metal oxide is selected from the group consisting of gallium, indium, thallium, lead and bismuth;

injecting the aqueous viscoelastic surfactant treating fluid through a wellbore and into the subterranean formation; and treating the subterranean formation.

10. The method of claim 9 where the alkaline earth metal is selected from the group consisting of magnesium, calcium, strontium, barium and mixtures thereof, where the alkali metal is selected from the group consisting of lithium, sodium, potassium, where the transition metal is selected from the group consisting of titanium and zinc, and mixtures thereof.

11. The method of claim 9 the aqueous viscoelastic surfactant treating fluid has an effect selected from the group consisting of:
- improved stability as compared with an otherwise identical fluid absent the additive,
- reduced precipitates as compared with an otherwise identical fluid absent the additive,
- and both.

12. The method of claim 9 where treating the subterranean formation is selected from the group consisting of
- fracturing the formation under effective pressure where the aqueous viscoelastic treating fluid further comprises a proppant;
- acidizing the formation where the aqueous viscoelastic surfactant treating fluid further comprises an acid;
- packing the formation with gravel where the aqueous viscoelastic surfactant treating fluid further comprises gravel;
- stimulating the formation where the aqueous viscoelastic treating fluid further comprises a stimulating agent;
- completing a well; and
- controlling fluid loss where the aqueous viscoelastic treating fluid further comprises a salt or easily removed solid; and mixtures thereof.

13. The method of claim 9 where for a period of time during the method the fluid is at a temperature between about 180° F. to about 300° F. (about 82° C. to about 149° C.).

* * * * *